United States Patent [19]

Earle

[11] Patent Number: 4,800,514

[45] Date of Patent: Jan. 24, 1989

[54] ELECTRONIC GRAPHIC ARTS PROPORTIONAL CALCULATOR

[76] Inventor: John R. Earle, 4711 S. Los Feliz, Tempe, Ariz. 85282

[21] Appl. No.: 55,137

[22] Filed: May 28, 1987

[51] Int. Cl.$^4$ ............... G06F 7/38; G06F 3/14
[52] U.S. Cl. ............... 364/715.07; 364/564; 364/710.1; 364/710.14
[58] Field of Search ............ 235/64.7; 364/560–564, 364/708–710, 715, 523; 355/14 C, 14 R, 59

[56] References Cited

U.S. PATENT DOCUMENTS

| | | | |
|---|---|---|---|
| 3,973,113 | 8/1976 | Goldsamt | 364/709 |
| 4,115,870 | 9/1978 | Lowell | 364/710 |
| 4,138,734 | 2/1979 | Nakata et al. | 364/710 |
| 4,156,281 | 5/1979 | Hirano et al. | 364/710 |
| 4,181,959 | 1/1980 | Tateishi | 364/705 |
| 4,181,960 | 1/1980 | Tateishi et al. | 364/705 |
| 4,195,348 | 3/1980 | Kakutani | 364/709 |
| 4,228,516 | 10/1980 | Johnson, Sr. | 364/710 |
| 4,250,554 | 2/1981 | Blum et al. | 364/560 |
| 4,270,173 | 5/1981 | Suttler | 364/564 |
| 4,446,528 | 5/1984 | Marmon | 364/709 |
| 4,486,849 | 12/1984 | Harigaya et al. | 364/709 |
| 4,488,250 | 12/1984 | Lipsey et al. | 364/710 |
| 4,615,611 | 10/1986 | Yoshiura | 355/14 R |

Primary Examiner—Gary V. Harkcom
Assistant Examiner—Dale M. Shaw
Attorney, Agent, or Firm—David G. Rosenbaum; Harry M. Weiss

[57] ABSTRACT

A specialized dimension proportioning hand-held calculator designed specifically for computing percent reductions of photographs in the graphic arts field. The calculator computes the percent reduction from an original width or height of the photograph and from the desired reduction width or height in decimal notation and fractional notation. The calculator also is designed to perform basic mathematical functions. The calculator is generally comprised of a mode selection device, a numerical keyboard, a keyboard display, a percent reduction display, a power cell, and four display cells comprised of decimal and fraction displays, an enter key, a constant key, and a display cell clear key. The calculator components are encased in a generally hard, rectangular casing. Power for the calculator is supplied by the power cell.

17 Claims, 2 Drawing Sheets

ELECTRONIC GRAPHIC ARTS PROPORTIONAL CALCULATOR

BACKGROUND OF THE INVENTION

The present invention relates generally to dimension proportioning hand-held calculators and, in particular, to a hand-held calculator for use in electronic graphic arts proportioning.

A significant task in the graphics arts profession involves enlarging and reducing graphic material to fit within definite reproducible spacing. It will be understood by those skilled in the art, that the present invention exhibits utility for electronically determining proper proportional sizing of any piece of reproducible graphic arts. For purposes of brevity, but not to be limited by, photographs shall serve as examples hereinafter. Currently, graphic artists utilize a hand-held manually operated wheel to obtain the percentage reduction or enlargement needed for a photograph, and then rely upon a conventional electronic calculator for arithmetic computations. The conventional graphic arts proportional wheel can be inaccurate, difficult to read, and hard to interpolate. Although electronic hand-held calculators have been specially designed for specific purposes in other fields, graphic artists still use the manual method due to the lack of an electronic proportional calculator for virtually instant determination of percentage reductions or enlargements required.

Conventional hand-held electronic calculators for measurement input or output are represented by U.S. Pat. No. 4,181,959 to Iwao Tateishi issued on Jan. 1, 1980 for a combined electronic digital scale and calculator with memory, U.S. Pat. No. 4,181,960 to Iwao Tateishi and Nobuyasu Kakutani issued on Jan. 1, 1980 for a combined electronic digital scale and calculator, and U.S. Pat. No. 4,195,348 to Nobuyasu Kakutani issued on Mar 25, 1980 for an electronic digital scale and calculator with selectable programs, and U.S. Pat. No. 4,488,250 to William Lipsey and Henry Teague issued on Dec. 11, 1984 for a calculator for performing calculations in feet, inches and fractions. Conventional hand-held calculators designed for other non-measurement, but computational, purposes are represented by U.S. Pat. No. 4,486,849 to Isao Harigaya and Akihiro Yamataka issued on Dec. 4, 1984 for a computer for calculating compound interest, U.S. Pat. No. 4,446,528 to Robert Marmon issued on May 1, 1984 for a shoppers calculator.

These representative conventional electronic calculators would be either incapable of use, or extremely cumbersome in use, for determination of percentage reduction and enlargement measurements in the graphic arts industry. When faced with the task of reproducing a photograph, for example, the graphic artist begins with an original work and a space into which the original work is to be inserted in the production copy. Thus, to determine the degree of reduction or enlargement, the artist will know the original height and width dimensions, and will know either the reproduction height or width restraints imposed by the position required for the reproduction. In order to make a proper determination of reproduction sizing, the artist must know at least three of these four values. Moreover, due to the high volume of reproduction work required of the graphic artist, it has been found desirable to have a calculator capable of variable entry, calculation and display, in both decimal and fraction values, variable entry of any three of the four height and width values and automatic calculation of the percentage reduction or enlargement required, based upon the variable entry of the height and width values. It will be understood by those skilled in the art, that the prior art does not include a hand-held calculator specifically adapted for easy use in electronic graphic arts proportioning.

SUMMARY OF THE INVENTION

It is, therefore, an object of the present invention to provide an electronic hand-held calculator to calculate percentage reductions and enlargements of graphic arts material for reproduction.

It is also an object of the present invention to provide an electronic hand-held calculator capable of displaying an original width and height, a reproduction width and height, and the percentage reduction or enlargement required for reproduction.

It is another object of the present invention to provide an electronic hand-held calculator which can operate using constants and variables while calculating percentage reduction or enlargement.

It is further an object of the present invention to provide an electronic hand-held calculator capable of conventional calculating and calculating graphics arts proportions.

These and other objects, features and advantages of the present invention, hereinafter disclosed, will become more apparent from the following, more detailed, description of the present invention with reference to the accompanying drawings.

DESCRIPTION OF THE PREFERRED EMBODIMENT

Figure 1:
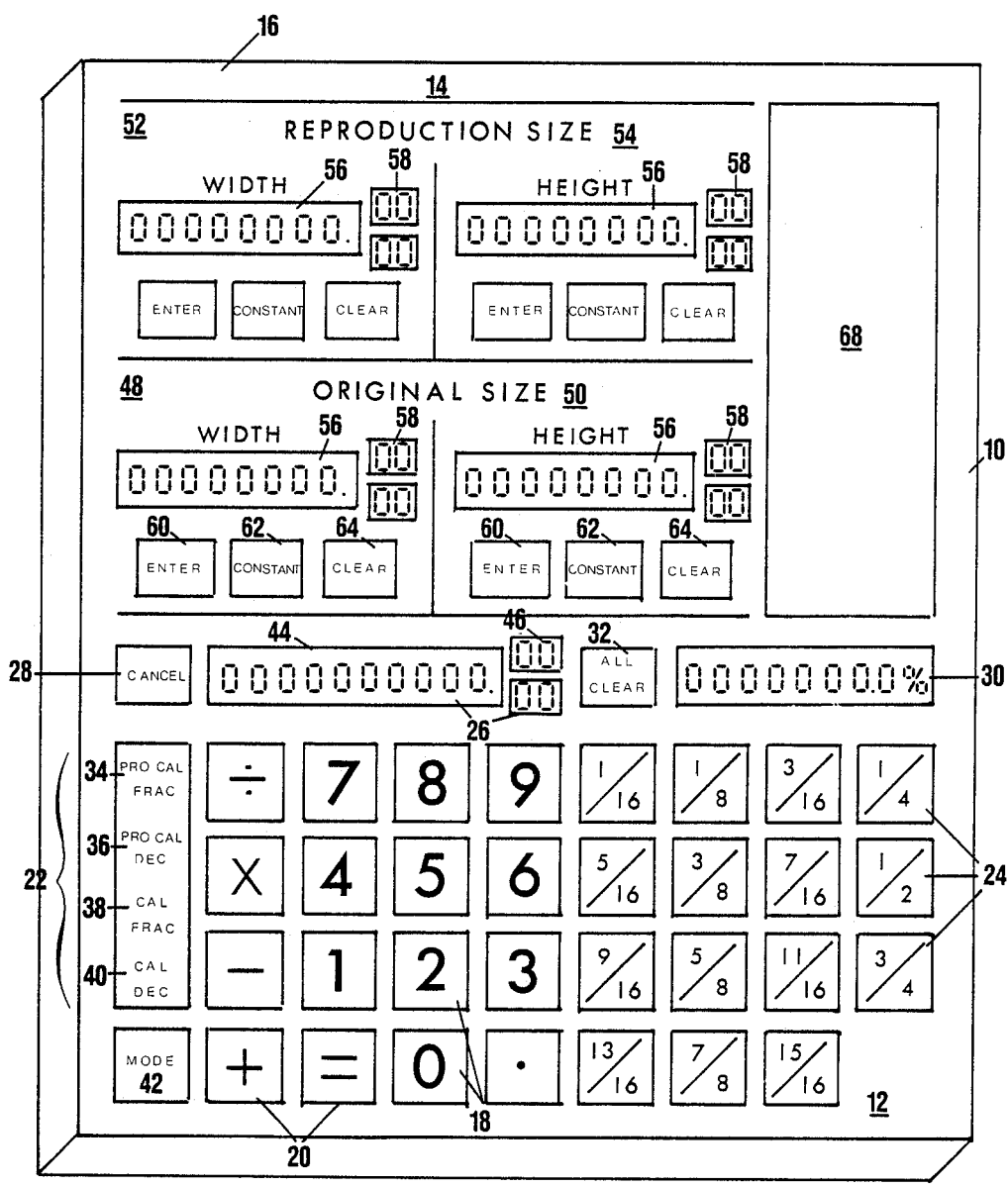
FIG. 1 is a top elevational view of a proportional graphic arts calculator according to the present invention.

Referring to the accompanying drawings, and in particular with reference to FIG. 1, there is shown a calculator 10 used to calculate the percent reduction or enlargement of a photograph. The calculator 10 consists generally of a keyboard 12, a plurality of display cells 48, 50, 52 and 54, a power source 66, and a casing 16.

The keyboard 12 consists generally of a number keyboard 18 having a plurality of numerical keys numbered 0 to 9 and decimal point, a mode display 22, a fraction keyboard 24 with a plurality of fraction keys of 1/16 increments, a primary entry display 26, a primary entry display cancel key 28, a percentage display 30, and an all clear key 32. The primary entry display 26 further comprises a decimal numerical display 44 and a fraction numerical display 46 consisting either of a unitary display or separate display for fraction numerators and fraction denominators and may have, as an alternative embodiment of the present invention, a function keyboard 20 with addition, subtraction, multiplication, division, and an "=" function keys. It will be appreciated by those skilled in the art, that each of the foregoing displays may consist of any conventional display means including, but not limited to liquid crystal displays or light emitting diodes.

The preferred embodiment of the mode display 22 comprises mode status displays for each of a proportional calculator fraction (pro cal frac) mode 34, a proportion calculator decimal (pro cal dec) mode 36, a calculator fraction (cal frac) mode 38, and a calculator decimal (cal dec) mode 40. Each mode is selected by activating a mode select key 42 operatively connected to each mode status display. The pro cal frac mode 34 allows the operator to operate in fractions when calculating the percentage reduction or enlargement of a photograph. The pro cal dec mode 36 allows the operator to use decimals when calculating the percent reduction of a photograph. The cal frac mode 38 and the cal dec mode 40 allows the operator to operate the calculator in fractions and decimals respectively when using the function keyboard 20.

An alternative embodiment of the mode display 22 comprises a mode select key 42 which operatively activates to one of a proportional decimal or a proportional fraction mode display.

The function of the primary entry display cancel key 28 is to cancel any number displayed on the primary entry display 26 and reset the primary entry display 26 to zero. The function of the all clear key 32 is to clear all displays on the calculator 10 except when the constant key 62 has been pressed.

The plurality of display cells 14 consists generally of a display cell 48 for the original width to be reproduced, a display cell 50 for its original height, a display cell 52 for the reproduction width, and a display cell 54 for the reproduction height. The display cell 48, the display cell 50, the display cell 52, and the display cell 54 have an enter function key 60, an enter constant key 62, and a display clear function key 64. Each display cell further comprises decimal numerical display 56 and the fraction numerical display 58.

The enter key 60, when pressed, takes a value registered in the keyboard display 26 and enters that value in either the decimal display 56 or the fraction display 58 depending upon whether the user has selected the decimal or fraction mode. The display cell clear key 64 resets the decimal display 56 and the fraction display 58 in its corresponding display cell to zero.

The constant key 62 is designed for calculating percentage enlargement or reduction for constant dimensions of either the original or reproduction. When the constant key 62 of a display cell 50 is pressed, the value displayed in the decimal display 56 and the fraction display 58 of that display cell can only be cleared by means of the corresponding display clear function key 64. Pressing the all clear key 32 will not reset the decimal display 56 and the fraction display 58 to zero in a particular display cell if the constant key 62 in that display cell is actuated.

The preferred embodiment of the power source 68 comprises a conventional solar cell. The function of the power source 68 is to provide operating power to the electronic hand-held calculator 10. However, any suitable AC or DC power source may be utilized.

OPERATION OF THE PREFERRED EMBODIMENT

Figure 2:
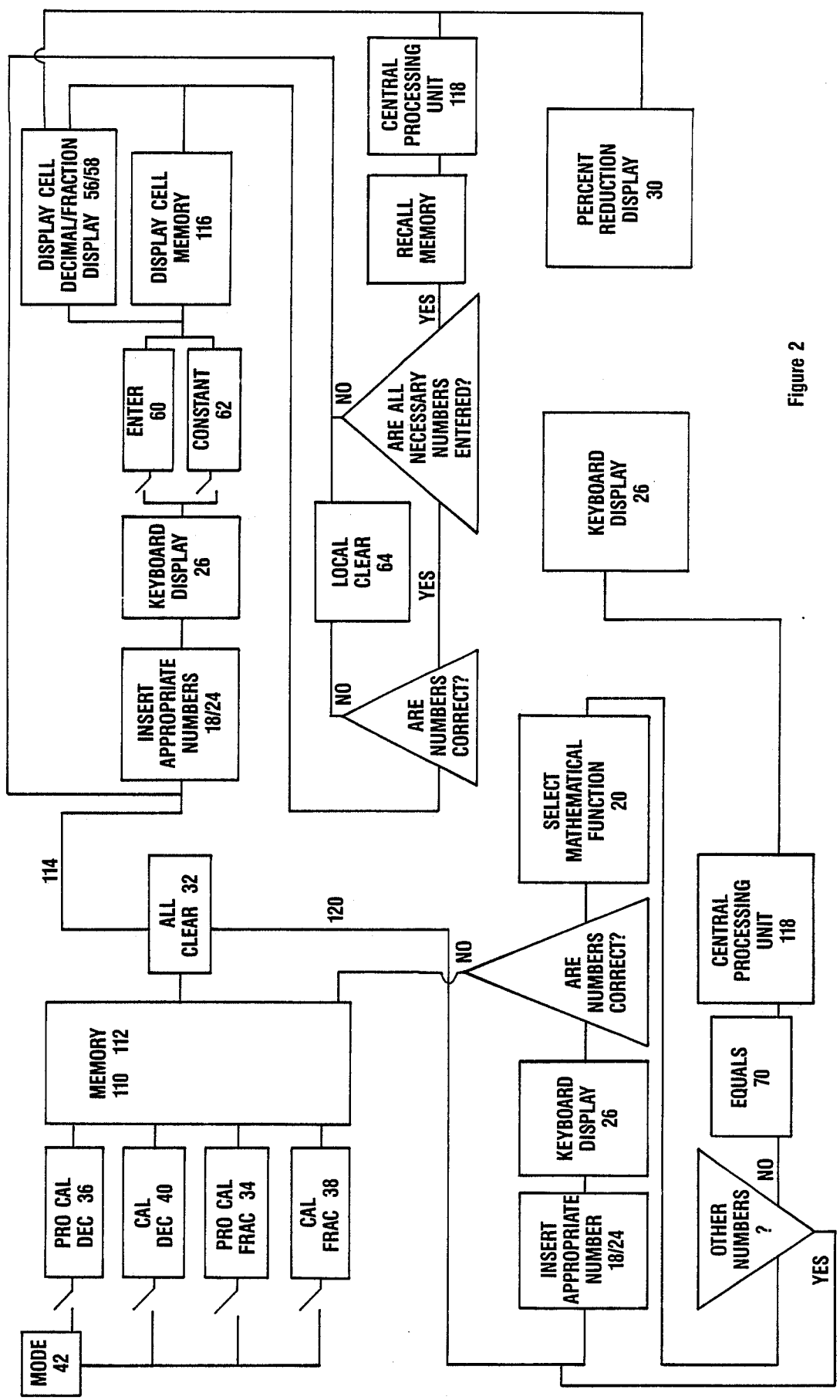
FIG. 2 is a schematic flow diagram of the operating process of the electronic proportional graphic arts calculator according to the present invention.

Referring in particular to FIG. 2, there is shown a flow schematic of the operation of calculator 10. A decimal memory 110 stores values for the number keyboard 18 and a fraction memory stores values for the fraction keyboard 24. When the pro cal dec mode 36 or the cal dec mode 40 is activated, the calculator will only accept values from the decimal memory 110. When the pro cal frac mode 34 or the cal frac mode 38 is activated, the calculator will accept values from both the decimal memory 110 and the fraction memory 112.

A percentage reduction or enlargement path 114 is activated when the pro cal dec mode 36 is activated, or when the pro cal frac mode 34 is activated. The percentage reduction or enlargement path 114 calculates the percentage reduction or enlargement of a photograph from the values entered in the display cells 52 and 48, or in the display cells 50 and 54 by means of the following steps:

(1) a value (1) is entered into the keyboard display 26 by means of the number keyboard 18 and the fraction keyboard 24, or by means of the number keyboard 18 only;

(2) value (1) is entered into a display cell (e.g. the display cell 48 for original width) from the keyboard display 26 by pressing the enter key 60 or the constant key 62 of that display cell into which value (1) is to be entered;

(3) value (1) is displayed on the decimal display 56 and the fraction display 58, and is stored in a display cell memory 116 for the corresponding display cell;

(4) if value (1) is not correct or needs to be changed, the decimal display 56, the fraction display 58, and the display cell memory 116 are reset to zero by means of the display cell clear key 64, and a new value must be entered from the keyboard display 26;

(5) a value (2) is entered into the keyboard display 26 by means of the number keyboard 18 and the fraction keyboard 24, and the value (2) is then entered into a display cell (e.g. the display cell 52 for reproduction width) by means of the enter key 60 or the constant key 62 for the corresponding display cell;

(6) value (2) is displayed in the decimal display 56 and the fraction display 58 and is stored in the display cell memory 116 for the respective display cell;

(7) value (2) may be cleared from the decimal display 56, the fraction display 58, and the display cell memory 116 by means of the display cell clear key 64, and a new value must be obtained from the keyboard display 26;

(8) a central processing unit (CPU) 118, such as a CMOS microprocessor, automatically retrieves the value (1) and the value (2) stored in the display cell memory 116, and calculates a percentage reduction (% red) or enlargement required according to the following formula:

$$\% \text{ red} = \frac{\text{Reproduction Dimension}}{\text{Original Dimension}} \times 100$$

wherein the Reproduction Dimension and the Original Dimension are dependent upon which height and width values are known. For example, if the original width and reproduction width are known, the percentage reduction or enlargement is expressed by the formula: % red=$(w_1/w_2) \times 100$; where the original height and reproduction height are known, the percentage reduction or enlargement is expressed by the formula: % red=$(h_1/h_2) \times 100$ wherein $h_1$ and $w_1$ represent the height and width values of the original work, and $h_2$ and $w_2$ represent the height and width values of the reproduced work;

(9) the percent reduction is registered on the percent reduction display 30.

In operation, the CPU 118 scans the inputs from the number keyboard 18, the fraction keyboard 24, the mode keyboard 22, and the display cell keys in order to determine the status of each of the keys. If any key has been pushed, the CPU moves that information into the appropriate entry register and performs computational operations on it which conventionally includes use of the decimal memory 110 and the fraction memory 112 and displays the appropriate information conveyed by the key into the corresponding display.

The CPU 118 calculates percentage reduction or enlargement for values of width or for values of height, but the CPU 118 will not calculate percentage reduction if there is only one value of width and one value of height. For example, a percentage will be calculated from a value (1) entered into the display cell 52 and a value (2) entered into the display cell 48, but will not calculate a percent reduction from a value (1) entered into the display cell 52 and a value (2) entered into the display cell 50 if there are no other values entered into display 14. If there is a value (1) entered into the display cell 52, a value (2) entered into the display cell 48, and another value (3) entered into either the display cell 54 or the display cell 50, the CPU 118 will calculate the percent reduction or enlargement from the values entered into the display cell 52 and the display cell 48, and will calculate a missing value (4) and display the value (4) in either the display cell 54 or the display cell 50, whichever did not have a value entered originally. Similarly, the CPU 118 will calculate a missing value (4) when values (1) and (2) are entered into both the display cell 50 and the display cell 54 and a value (3) is entered into either the display cell 52 or the display cell 48.

A calculator path 120 is activated when the cal dec mode 40 or the cal frac mode 38 is activated. The calculator 10 operates similar to a conventional mathematical calculator by means of the following steps:
(1) a value is entered into the keyboard display 26 by means of the number keyboard 18 and the fraction keyboard 24, or by means of the number keyboard 18 only;
(2) the operator selects the appropriate function from the function keyboard 20;
(3) consecutive values and functions are pressed as appropriate;
(4) an equals key 70 on the function keyboard 20 is pressed to end the calculation and tally the answer by means of the CPU 118, and the answer is displayed in the keyboard display 26.

According to an alternative embodiment of the present invention, the mode keyboard 22 does not require the operator to activate a specific mode in order to activate the percentage reduction enlargement path 114 or the calculator path 120. Rather, the percentage reduction or enlargement path 114 is activated automatically when values from the keyboard display 26 are entered into the display cell 48 and the display cell 52, or into the display cell 54 and the display cell 50. In this manner, calculator path 120 is continuously activated. The mode key 42 allows the operator to change from decimal only computations to computations using both decimals and fractions, and back to decimal only computations.

While the invention has been particularly shown and described in reference to the preferred embodiments thereof, it will be understood by those skilled in the art that changes in form and details may be made without departing from the spirit and scope of the invention.

I claim:
1. A portable hand-held electronic calculator for decimal and fraction calculations of proportional percentages for reductions and enlargements of graphic works, said calculator comprising:
   a housing containing numerical keys, fraction keys and computation means for performing a plurality of computations based upon which of said numerical keys and fraction keys are pressed, said computation means being operatively connected to said numerical and said fraction keys;
   a plurality of displays connected to each of said numerical keys, said fraction keys and to said computation means for displaying numerals therein, each of said plurality of displays further including memory means for storing values entered therein, display means for displaying at least one of decimal notation and combined whole number and fraction notation, at least one of said plurality of displays further including percentage display means for displaying percentages and at least one of said plurality of displays further comprising a keyboard entry display connected to said numerical keys and to said fraction keys;
   a plurality of display function keys connected to each of said plurality of displays, said plurality of display function keys further comprising at least one of an enter function key, an enter constant key, a display clear function key, and an all clear key;
   mode select means for selecting one of a proportional calculation decimal mode and a proportional calculation fractional mode; and
   electric source means for providing electrical power to the calculator.

2. The electronic calculator according to claim 1, wherein said fraction keys further comprise 1/16 increments.

3. The electronic calculator according to claim 1, wherein said computation means further comprises a low power consumption microprocessor.

4. The electronic calculator according to claim 3, wherein said low power consumption microprocessor further comprises a CMOS microprocessor.

5. The electronic calculator according to claim 1, wherein said plurality of displays further comprise a primary entry display having a decimal numerical display and a fraction numerical display, said primary entry display being connected to said numerical entry keys, said fraction entry keys, said function keys, and said mode selection means, and receiving keyed input therefrom; said plurality of displays further having a plurality of secondary display cells, said secondary display cells further having a decimal numerical display, a fraction numerical display, a display cell enter key, a display cell constant key, and a display cell clear key, and wherein said plurality of displays further comprises a computed percentage display connected to said computation means and displaying computed percentage reductions and enlargements therein.

6. The electronic calculator according to claim 1, wherein said housing further comprises a plurality of arithmetic function keys comprising addition, subtraction, multiplication and division keys.

7. The electronic calculator according to claim 6, wherein said mode select means further comprises an calculator decimal mode and a calculator factional mode.

8. A method for electronically calculating the percent reduction or enlargement of graphics comprising the steps of:

- selecting one of a decimal notation and a combined whole number and fraction mode by activating one of a decimal mode key and a combined whole number and fraction mode key;
- activating at least one of a plurality of numerical keys and a plurality of fraction keys and displaying a first value therefrom on a keyboard display connected thereto;
- entering said displayed value into a display cell display comprising at least one of a display cell decimal display and a display cell fraction display;
- activating an enter constant key if said displayed first value is to be a constant in a series of repetitive calculations performed by said calculator, thereby maintaining said displayed first value as a constant value;
- clearing said display cell display by activating a display clear function key, thereby resetting said display cell display if said displayed first value is incorrect;
- selecting a second value by activating said at least one of a plurality of numerical keys and a plurality of fraction keys and displaying said second selected value therefrom on said keyboard display connected thereto;
- entering said displayed second value into a second display cell display comprising at least one of a display cell decimal display and a display cell fraction display;
- activating an enter constant key if said displaced second value is a constant in a series of repetitive calculations performed by said calculator, thereby maintaining said displayed second value as a constant value;
- clearing said second display cell display by activating a display clear function key connected therewith, thereby resetting said display cell display if said displayed value is incorrect;
- retrieving said first value from said first display cell and retrieving said second value from said second display cell and entering said first value and said second value into a central processing unit for calculation of a percentage reduction or enlargement value by said central processing unit; and
- automatically displaying said percent reduction or enlargement value on a percentage display connected to said central processing unit.

9. The method according to claim 8 wherein said method further comprises:

- entering a third value into a third display cell such that said central processing unit calculates said percent reduction value and a fourth value to be entered by the central processing unit into a fourth display cell and automatically displays said fourth value in said decimal numerical display and said fraction numerical display of said fourth display cell, and displays said percent reduction value in said percent reduction display.

10. An electronic proportional calculator for calculating a percentage reduction or enlargement of graphics comprising:

- a keyboard memory wherein a plurality of numerical values are stored until reset;
- mode selection means for access to said plurality of numerical values, said mode selection means connected to said keyboard memory;
- numerical keyboard means for selecting a value from said plurality of numerical values, said numerical keyboard means connected in series to said mode selection means;
- a keyboard display connected in series to said numerical keyboard for displaying said value selected by said numerical keyboard;
- a plurality of display cells connected in series with said keyboard display wherein said plurality of display cells generally accept, store, and display said value from said keyboard display;
- microprocessor means for calculating a percentage reduction or enlargement value and a plurality of mathematical functions, said microprocessor means being connected in series with each of said plurality of display cells;
- a percent reduction display connected in series with said microprocessor means, for displaying said percentage reduction or enlargement value thereon;
- a primary entry display cancel key for resetting said primary entry display to zero;
- function selection means for selecting said plurality of mathematical functions said function selection means being connected to said microprocessor means;
- an all clear key wherein said all clear key resets said keyboard display, said display cell decimal display, said display cell fraction display, and said percent reduction display to zero but does not reset said display cell decimal display and said display cell fraction display to zero when said constant key has been pressed;
- power source means for supplying electrical power to said electronic calculator; and
- a calculator casing, substantially enclosing, said keyboard, said mode selection means, said plurality of display cell displays, said keyboard display, said function selection means, said microprocessor means and said percentage reduction and enlargement display.

11. The electronic calculator according to claim 10 wherein said numerical keyboard comprises a decimal keyboard consisting of a plurality of designated decimal numbers and a fraction keyboard consisting of a plurality of designated fraction numbers.

12. The electronic calculator according to claim 10 wherein said plurality of display cells comprises:

- a decimal numerical display which displays a decimal portion of said value from said primary entry display;
- a fraction numerical display which displays a fraction portion of said value from said primary entry display;
- an enter function key for retrieving said value from said primary entry display and entering said value into said decimal numerical display and said fraction numerical display of said display cell;
- an enter constant key connected in parallel and as an alternate to said enter function key for retrieving said value from said primary entry display and entering said value into said decimal numerical display and said fraction numerical display as a constant value used in repetitive calculations; and a clear function key wherein said clear function key resets said decimal numerical display and said fraction numerical display to zero.

13. The electronic calculator according to claim 10 wherein said mode selection device comprises:
   a calculator fraction key which selects a mode for calculating mathematical functions in fractional notation consisting of whole numbers and fractions;
   a calculator decimal key which selects a mode for calculating mathematical functions in decimal notation;
   a proportion calculator fraction key which generally selects a mode for computing said percent reduction value when calculating in fractional notation consisting of whole numbers and fractions; and
   a proportion calculator decimal key which selects a mode for computing said percent reduction value when calculating in decimal numbers.

14. The electronic calculator according to claim 10 wherein said mode selection device comprises a mode key which allows computing said percent reduction value and calculating said plurality of mathematical functions in all decimal notation, and alternatively allows computing said percent reduction value and calculating said plurality of mathematical functions in fractional notation consisting of whole numbers and fractions.

15. The electronic calculator according to claim 10 wherein said primary entry display further comprises a decimal numerical display and a fraction numerical display.

16. A method of calculating a percentage reduction or enlargement of graphics works, utilizing an electronic central processing unit of an electronic hand-held calculator, comprising the steps of: scanning the inputs from a plurality of numerical keys, a plurality of fractions keys and a plurality of function keys to determine the status of each of said keys; entering a value from at least one of said plurality of numerical keys and said plurality of fraction keys into a primary entry display; entering said value from said primary entry display into a display means for displaying decimal and fraction notation and a display cell memory of one of a plurality of display cells when either of said enter function key or said entry constant key is activated; scanning a plurality of display cells comprising a display, an enter function key, an enter constant key, and a display clear function key to determine a status of said value entered into at least one of said plurality of display cells; retrieving a second value from said plurality of numerical keys and said plurality of fraction keys, entering said second value into said primary entry display, and entering said second value into said display cell memory and display means for displaying decimal and fraction notation of another of said plurality of display cells; recalling said value and said second value in said plurality of display cells and electronically computing a percent reduction or enlargement value through the equation "percent reduction $= (w_1/w_2) \times 100$" for width reduction or enlargement, and the equation "percent reduction $= (h_1/h_2) \times 100$" for height reduction or enlargement, wherein $h_1$ and $w_1$ represent the height and width values of an original work, and wherein $h_2$ and $w_2$ represent the height and width values of a reproduced work; and displaying said percent reduction or enlargement value in a percentage display means for displaying said percent reduction or enlargement value.

17. The method according to claim 16 comprising the steps of: entering a third value into said primary entry display, retrieving a third value from said primary entry display, entering said third value into said display cell memory and said display means for displaying decimal and fraction notation of a third of said plurality of display cells, calculating a fourth value and entering said fourth value into said display means for displaying decimal and fraction notation and a display cell memory of a fourth of said plurality of display cells.

* * * * *